(12) United States Patent
D'Angelo et al.

(10) Patent No.: US 8,833,159 B2
(45) Date of Patent: Sep. 16, 2014

(54) FUEL SENDERS AND METHODS OF ASSEMBLING FUEL SENDERS

(75) Inventors: Gian-Marco D'Angelo, Portland, OR (US); Dameion Reed Brown, Hillsboro, OR (US)

(73) Assignee: ISSPRO, Inc., Portland, OR (US)

( * ) Notice: Subject to any disclaimer, the term of this patent is extended or adjusted under 35 U.S.C. 154(b) by 527 days.

(21) Appl. No.: 13/102,391

(22) Filed: May 6, 2011

(65) Prior Publication Data

US 2012/0279295 A1 Nov. 8, 2012

(51) Int. Cl.
| | |
|---|---|
| *G01F 23/00* | (2006.01) |
| *G01F 23/74* | (2006.01) |
| *G01F 23/36* | (2006.01) |
| *G01F 23/38* | (2006.01) |

(52) U.S. Cl.
CPC .............. *G01F 23/74* (2013.01); *G01F 23/36* (2013.01); *G01F 23/38* (2013.01)
USPC .......................................................... 73/313

(58) Field of Classification Search
CPC .......... G01F 23/36; G01F 23/38; G01F 23/72
USPC .......................................................... 73/313
See application file for complete search history.

(56) References Cited

U.S. PATENT DOCUMENTS

| | | | |
|---|---|---|---|
| 4,472,969 A | 9/1984 | Templin | |
| 4,483,192 A | 11/1984 | Wachter | |
| 4,857,894 A | 8/1989 | Dahl | |
| 4,890,492 A | 1/1990 | Andrejasich et al. | |
| 4,920,798 A | 5/1990 | Weaver | |
| 4,942,274 A | 7/1990 | Riback et al. | |
| 5,299,456 A | 4/1994 | Steiner | |
| 5,627,523 A | 5/1997 | Besprozvanny et al. | |
| 6,623,682 B2 | 9/2003 | Amburgey et al. | |
| 6,672,778 B2 | 1/2004 | Sato et al. | |
| 6,783,336 B2 | 8/2004 | Kempfer et al. | |
| 7,121,140 B2 | 10/2006 | Lo | |
| 7,201,052 B2 | 4/2007 | Lee | |
| 7,343,800 B2 | 3/2008 | Harman et al. | |
| 7,418,861 B2 | 9/2008 | Fling et al. | |
| 7,437,929 B2 | 10/2008 | Koide et al. | |
| 7,444,865 B2 | 11/2008 | Fling et al. | |
| 7,536,989 B2 | 5/2009 | Tomoyuki et al. | |
| 7,562,571 B2 | 7/2009 | Raffalt | |
| 2002/0108441 A1 | 8/2002 | Liu | |
| 2006/0048571 A1 | 3/2006 | Lee | |
| 2006/0117847 A1 | 6/2006 | Lo | |
| 2007/0006648 A1 | 1/2007 | Koide et al. | |
| 2007/0283756 A1 | 12/2007 | Fling et al. | |
| 2010/0043543 A1 | 2/2010 | Husain | |

OTHER PUBLICATIONS

U.S. Appl. No. 29/391,315, filed May 6, 2011, D'Angelo.

*Primary Examiner* — Hezron E Williams
*Assistant Examiner* — Rodney T Frank
(74) *Attorney, Agent, or Firm* — Dascenzo Intellectual Property Law, P.C.

(57) ABSTRACT

Fuel senders and methods of assembling fuel senders are disclosed. Fuel senders according to the present disclosure include a housing with detector retaining structure, a detector that is wedged against an inside surface of the housing by the detector retaining structure, and a connector for electrically coupling the detector to a display device. In some embodiments, the detector retaining structure consists of two ribs extending longitudinally along the inside surface of the housing.

18 Claims, 3 Drawing Sheets

FUEL SENDERS AND METHODS OF ASSEMBLING FUEL SENDERS

FIELD

The present disclosure is related to fuel senders and to methods of assembling fuel senders.

BACKGROUND

Fuel senders are electronic liquid level sensors that are used to detect the level of fuel held in a fuel tank. For example, liquid-fuel powered land vehicles and marine craft typically include a fuel sender associated with and connected to a fuel tank. Fuel senders typically send a signal to an associated display (e.g., a fuel gauge) for visual representation of the level of fuel held in the fuel tank. Examples of electronic liquid level sensors, including fuel senders, are disclosed in U.S. Pat. Nos. 4,857,891, 4,920,798, 5,627,523, 6,408,692, 7,121,140, and 7,343,800 and in U.S. patent application Publication Nos. 2002/0108441 and 2010/0043543, the disclosures of which are incorporated herein by reference.

SUMMARY

Fuel senders, methods of assembling fuel senders, and assembly tools for assembling fuel senders are disclosed herein.

Fuel senders according to the present disclosure include a housing with detector retaining structure, a detector that is wedged against an inside surface of the housing by the detector retaining structure, and a connector for electrically coupling the detector to a display device. In some embodiments, the detector retaining structure consists of two ribs extending longitudinally along the inside surface of the housing. Other configurations of detector retaining structure are also disclosed herein and are within the scope of the fuel senders according to the present disclosure.

Methods of assembling an illustrative, non-exclusive example of a fuel sender according to the present disclosure include (i) positioning a sealing member within a space defined by a circular wall of a mounting member of the fuel sender and between the connector and the mounting member of the fuel sender, (ii) engaging an upper edge of the circular wall with a roller, and (iii) rotating the mounting member relative to the roller or revolving the roller around the mounting member so that the roller crimps the upper edge of the circular wall over the connector.

Assembly tools according to the present disclosure may be used to assemble illustrative, non-exclusive examples of fuel senders according to the present disclosure. For example, an assembly tool may include a fixture configured to retain at least a portion of the connector of the fuel sender within a space defined by a circular wall of a mounting member of the fuel sender, a roller configured to selectively engage the upper edge of the circular wall, and a mechanism configured to revolve the roller around an upper edge of the circular wall and/or to rotate the mounting member relative to the roller so that the upper edge is crimped over the connector of the fuel sender.

DETAILED DESCRIPTION

Figures 1, 2, 3, 4, 6:
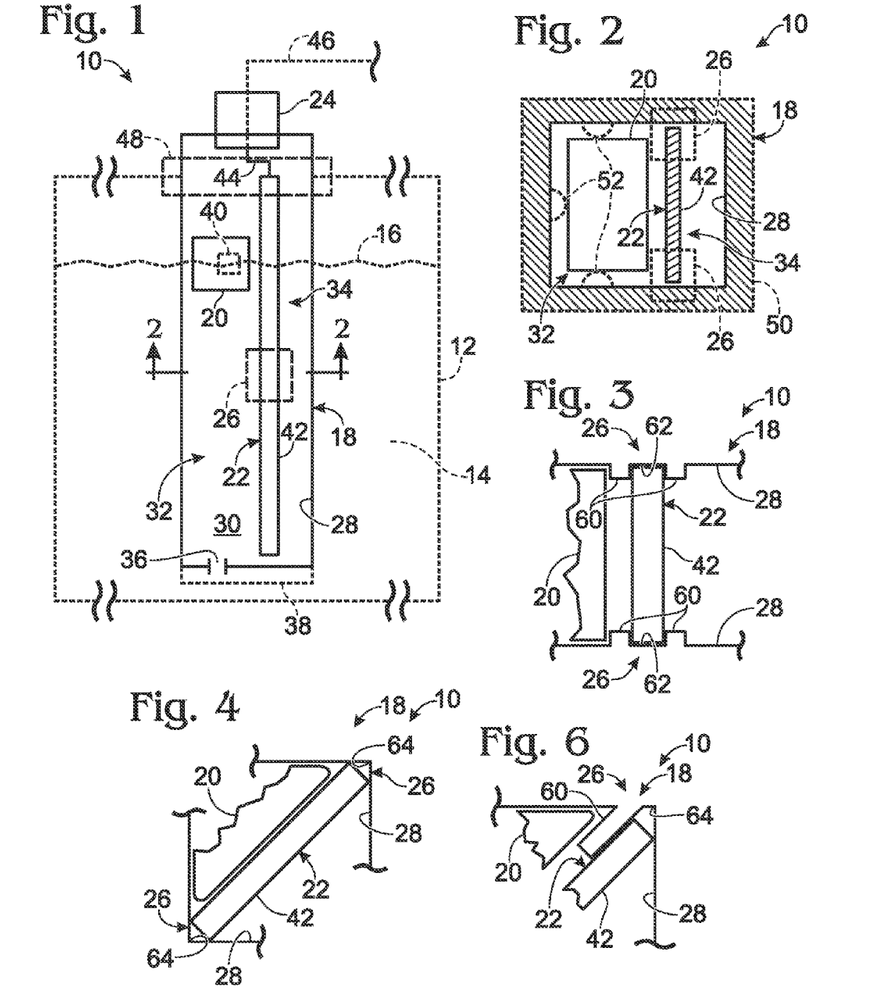
FIG. 1 is a schematic illustration representing illustrative, non-exclusive examples of fuel senders according to the present disclosure, together with an associated fuel tank.
FIG. 2 is a schematic cross-sectional view representing illustrative, non-exclusive examples of fuel senders according to the present disclosure, with the cross-section schematically corresponding to the line 2-2 in FIG. 1.
FIG. 3 is a somewhat less schematic diagram representing a portion of illustrative, non-exclusive examples of fuel senders according to the present disclosure.
FIG. 4 is a somewhat less schematic diagram representing a portion of additional illustrative, non-exclusive examples of fuel senders according to the present disclosure.
FIG. 6 is a somewhat less schematic diagram representing a portion of additional illustrative, non-exclusive examples of fuel senders according to the present disclosure.

Fuel senders according to the present disclosure are schematically illustrated in FIG. 1 and generally indicated at 10. Fuel senders according to the present disclosure also may be described as liquid level sensors and are not limited to being used to sense, detect, or measure the level of fuel in a fuel tank. That is, while referred to herein as fuel senders, the structure and functionality of fuel senders according to the present disclosure may be used for any suitable liquid level measuring regardless of the application.

Fuel senders 10 are schematically illustrated in FIG. 1 together with a vessel 12 for holding a volume of liquid 14 having an associated level 16 within the vessel. Illustrative, non-exclusive examples of suitable vessels include (but are not limited to) fuel tanks associated with automobiles, trucks, heavy machinery, marine craft, generators, etc. Illustrative, non-exclusive examples of liquid fuels include (but are not limited to) gasoline, diesel, and alcohol; however, as mentioned, fuel senders according to the present disclosure also may be used to detect the level 16 of any suitable liquid 14 held in a vessel 12. As an illustrative, non-exclusive example, fuel senders according to the present disclosure may be used to detect the level of water held in a water tank.

As schematically illustrated in FIG. 1, fuel senders 10 according to the present disclosure include at least a housing 18, a float 20 positioned within the housing and configured to rise and fall with the level 16 of liquid 14 held in an associated vessel 12, a detector 22 positioned within the housing and configured to detect the position of the float within the housing, and a connector 24 electrically coupled to the detector and configured to be selectively coupled to a display for displaying the level of liquid held in the associated vessel.

Housing 18 is configured to extend at least partially (and in some embodiments, fully) into an associated vessel 12, and includes detector retaining structure 26 for retaining and securing detector 22 within the housing. Detector retaining structure 26 is schematically illustrated in FIG. 1 as a dashed box generally overlapping the detector, schematically representing that the detector retaining structure may take any suitable form and may be positioned within the housing at any suitable position along the length of the housing, including along the entire length of the housing, as discussed herein.

Housing 18 includes an inside surface 28 that defines an internal volume 30 of the housing. The internal volume may be described as having a float region 32 and a detector region 34 that is adjacent to the float region. The float region is a region within the internal volume in which float 20 is permitted to rise and fall with the level of liquid, and the detector region is a region within the internal volume in which the detector is secured within the housing.

Fuel senders 10 are configured to permit liquid 14 to enter and exit the internal volume of the housing, so that the level of liquid within the internal volume corresponds to the overall level of liquid held in the vessel. A passage 36 is schematically illustrated in FIG. 1 as extending through housing 18; however, any suitable structure may be utilized and fuel senders according to the present disclosure are not limited to housings with passages extending therethrough. For example, as schematically illustrated in FIG. 1, a fuel sender may include an end cap 38 that is coupled to the housing and which defines one or more passages 36 for permitting liquid to enter and exit the internal volume of a housing 18.

Housings 18 according to the present disclosure may be constructed of any suitable material utilizing any suitable process. As an illustrative, non-exclusive example, a housing 18 may be constructed of aluminum and formed utilizing an extrusion process.

Float 20 is positioned within the float region of the internal volume of the housing and is configured to rise and fall within the float region in response to the level of liquid held in the associated vessel. Floats according to the present disclosure may be constructed of any suitable material such that they are buoyant with respect to the liquid associated with the particular application of a fuel sender according to the present disclosure. As an illustrative, non-exclusive example, a float 20 may be constructed at least partially of a synthetic rubber, such as a closed cell nitrile rubber or a hard foam rubber cellular ebonite having a density of approximately 0.28 grams per cubic centimeter. Floats 20 may additionally include one or more magnets 40, which, as discussed herein, may interact with the detector for detection of the float's position within the housing.

Detector 22 is secured within the detector region of the internal volume of the housing by detector retaining structure 26. Detectors 22 according to the present disclosure are configured to detect a position of a float 20 within the float region of the internal volume of a housing 18. In some embodiments, detector 22 includes a body 42 that is wedged between the inside surface of the housing and the detector retaining structure, as discussed in more detail herein. As schematically illustrated in FIG. 1, body 42 may be described as a generally elongate body, such as a generally rectangular prism. As an illustrative, non-exclusive example, the body of detector 22 may be a circuit board or similar structure.

A detector 22 according to the present disclosure may take any suitable configuration such that it is configured to detect the position of the float within the housing. As an illustrative, non-exclusive example, a detector may include a plurality of switches positioned along a longitudinal length of the detector, with the switches being configured to open and close responsive to the float rising and falling within housing 18, such as responsive to magnet 40 coming into and out of proximity with the switches as the level of liquid within the housing rises and/or falls.

As mentioned and as schematically illustrated in FIG. 1 at 44, connector 24 is electrically coupled to detector 20, and as schematically illustrated by the dashed line at 46, is configured to be selectively coupled electrically to a display device for displaying the level of liquid held in vessel 12. An illustrative, non-exclusive example of a suitable display device is a fuel gauge, such as typically utilized in automotive and marine applications; however, other suitable display devices also may be used. Connector 24 may take any suitable form, such as (but not limited to) a plug or socket configured to mate with an associated socket or plug of a wiring harness associated with a display device. A connector may additionally or alternatively include one or more wires configured to be hard-wired to an associated wiring harness. Other configurations are also within the scope of the present disclosure.

Fuel senders 10 according to the present disclosure may in some embodiments additionally include a mounting member 48, as schematically illustrated in FIG. 1 and which may be described as being configured to mount, or secure, the fuel sender to an associated vessel 12. Mounting member 48, when present, may take any suitable form, and may be associated with, may be integral to, or may be separate from housing 18 and/or connector 24. These various configurations are schematically represented by the dashed box representing optional mounting member 48 overlapping housing 18, but the schematic illustration does not limit the structure and/or configurations of suitable mounting members that may be incorporated into fuel senders according to the present disclosure.

Referring now to FIG. 2, fuel senders 10 according to the present disclosure are illustrated schematically with housing 18 and body 42 of detector 22 in cross-section. Housing 18 is illustrated schematically as having a generally square configuration; however, housings according to the present disclosure are not limited to having square configurations, and the schematic illustration of FIG. 2 represents any and all suitable configurations of housings according to the present disclosure. Moreover, a housing 18 is not required to have a uniform thickness to its walls, and this is schematically represented by an outside surface 50 being illustrated in dashed lines in FIG. 2. That is, the outside surface 50 and the inside surface 28 of the housing are not required to define concentric profiles. In fact, the configuration of the outside surface of housing 18 may take any suitable form without affecting the functionality and utility of fuel senders according to the present disclosure. That is, the configuration of the outside surface of a housing 18 according to the present disclosure may be ornamental, or aesthetic, in nature. As an illustrative, non-exclusive example, outside surface 50 ornamentally, or aesthetically, may define a generally hexagonal outer profile, such as embodied in the fuel senders disclosed in U.S. Design patent application Ser. No. 29/391,315, entitled FUEL SENDER, filed on May 6, 2011, and the disclosure of which is incorporated herein by reference.

Some housings 18 according to the present disclosure may include an inside surface that includes a plurality of flat surfaces. For example, although not required, the plurality of flat surfaces generally may define a polygonal profile of the internal volume of the housing, such as illustrated by the schematic square profile of FIG. 2. Additionally, although not required, the polygonal profile, when present, may be a regular polygonal profile, such as with the plurality of flat surfaces generally having equal widths, again, such as illustrated by the schematic square profile of FIG. 2. By "generally may define a polygonal profile" and by "generally having equal widths," it is meant that the overall impression of the profile may resemble or define such recited features, but that additional structure, as discussed herein, may in fact be included that breaks up, or extends from, one or more of the plurality of flat surfaces, for example, thereby forming a non-perfect polygonal profile, etc. "Generally" may be used in a similar manner herein to describe other aspects of fuel senders according to the present disclosure. As an illustrative, non-exclusive example and as schematically illustrated in FIG. 2, housing 18 may include one or more projections 52 extending from the inside surface 28 into the float region 32 of the housing. When present, these projections 52 may serve to space float 20 away from the inside surface of the housing and thereby reduce the friction between the float and the housing as the float rises and/or falls within the float region. Additionally or alternatively, the projections may prevent, or at least restrict, the float from becoming bound, or stalled, against the inside surface of the housing when the liquid within the float region rises and/or falls. Moreover, projections 52, when present, are not required to extend from a flat inside surface of a housing 18 and may additionally or alternatively extend from a curved, or non-flat, portion of the inside surface of the housing.

Still referring to FIG. 2, the body 42 of detector 22 is schematically illustrated as generally spanning across an inside dimension of the housing, with detector retaining structure 26 schematically illustrated as securing the detector within detector region 34 of the internal volume. In FIG. 2, the detector retaining structure is schematically illustrated as two dashed boxes overlapping the wall of the housing and the body of the detector, schematically representing that the detector retaining structure may take any suitable configuration, including being integral to, at least partially integral to, or separate from the housing. While FIG. 2 and the subsequently discussed FIGS. 3-8 schematically illustrate a cross-sectional profile of fuel senders according to the present disclosure, it should be understood that the body of the detector may extend substantially (and in some embodiments fully) an entire longitudinal length of the housing. Similarly, the detector retaining structure, such as the subsequently discussed ribs 60, when present, may extend substantially an entire longitudinal length of the housing. Additionally or alternatively, a series of detector retaining structures, such as ribs 60 or other projections, may be spaced along the longitudinal length of the housing, and still may be described as detector retaining structure that extends along the longitudinal length (and in some embodiments along the entire length) of the housing. For example, in the illustrative, non-exclusive example of an extruded housing including at least one rib extending from the inside surface and into the internal volume of the housing, removing a portion of one or more portions of the extruded rib along its longitudinal length, thereby forming a series of longitudinally spaced ribs, still may be described as having a rib that extends longitudinally along the inside surface of the housing.

In FIG. 2, the schematic representation of detector retaining structures 26 are illustrated as being engaged with, or at least directly adjacent to, float 20 within the internal volume of the housing. This is intended to schematically represent that in addition to retaining detector 22 within the housing, detector retaining structure 26 may additionally and optionally also serve to space the float away from the detector. For example, such an optional configuration may facilitate separation between the float and the detector, such as to restrict engagement therebetween, which otherwise could interfere with the operation of the detector and/or could result in the float becoming bound, or stalled, against the adjacent surface of the detector and/or components positioned thereon.

In comparison to FIG. 2, FIGS. 3-8 illustrate somewhat less schematic profile views of portions of various illustrative, non-exclusive examples of fuel senders 10 according to the present disclosure, including various illustrative, non-exclusive configurations of detector retaining structures 26. By "somewhat less schematic," it is meant that the portions of fuel senders 10 illustrated in FIGS. 3-8 illustrate the general configuration of respective embodiments, but that suitable variations and optional structure are within the scope of the illustrated embodiments. For example, the thickness of the wall of housing 18 and outside surface 50 of the housing are not illustrated in FIGS. 3-8, schematically representing that the illustrated embodiments may have any suitable wall thickness and outside surface configuration, and as mentioned herein, that the outside surface configuration may be purely ornamental, or aesthetic, in nature. Specifically, FIGS. 3-8 are intended to schematically illustrate examples of detector retaining structure 26 and the resultant relationship and interaction between the detector retaining structure, body 42, and float 20.

The illustrative, non-exclusive example of housing 18 illustrated in FIG. 3 includes detector retaining structure 26 that is defined by two pairs of ribs 60 extending from opposing sides of the internal volume of the housing. Each pair of ribs define a channel 62 for receiving a respective edge of the body of the detector. Accordingly, the pair of ribs secures the detector in the detector region of the internal volume of the housing and in a suitable relationship to float 20. As further illustrated in FIG. 3, one rib from each pair of ribs serves to space the float away from the detector and therefore facilitates separation between the float and the detector, as discussed herein.

In FIGS. 3 and 5-8, ribs 60 are illustrated as, and may be described as, having generally rectangular or trapezoidal profiles; however, any suitable configuration of ribs 60, when present, is within the scope of the present disclosure, including (but not limited to) ribs having a generally arcuate, or curved, profile, as well as profiles that may be described as regular or irregular in shape.

The illustrative, non-exclusive example of housing 18 illustrated in FIG. 4 includes detector retaining structure 26 that is defined by two opposing apexes 64 defined by the inside surface 28 of the housing. This configuration may be described as including detector retaining structure that wedges the body of the detector between two adjacent flat surfaces of the inside surface of the housing. In FIG. 4, apexes 64 are schematically illustrated as being defined by right, or 90 degree, angles, such as associated with a generally square or other generally rectangular profile of a housing 18. However, other examples of opposing apexes 64 are also within the scope of the present disclosure, including apexes associated with a generally hexagonal profile of a housing. As discussed herein, other polygonal profiles are also within the scope of the present disclosure, and the present disclosure is not limited to rectangular and hexagonal profiles. Moreover, while illustrated as including two detector retaining structures 26, both being defined by opposing apexes 64, it is within the scope of the present disclosure that the various detector retaining structures 26 illustrated in FIGS. 3-8 and discussed herein may be mixed and matched, such that two detector retaining structures having different configurations may be embodied in fuel senders according to the present disclosure. This is further schematically represented in FIGS. 5-8, in so far as each of these Figures illustrate only one detector retaining structure associated with a single edge of the body of the detector.

Figure 5:
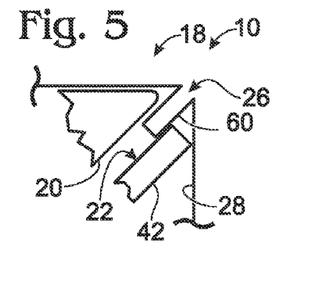
FIG. 5 is a somewhat less schematic diagram representing a portion of additional illustrative, non-exclusive examples of fuel senders according to the present disclosure.

The illustrative, non-exclusive example of detector retaining structure 26 illustrated in FIG. 5 may be described as including a rib 60 that extends from an inside apex defined by the inside surface of the housing. Accordingly, the illustrated detector retaining structure may be described as retaining, securing, and/or wedging the edge of the detector's body against the inside surface of the housing.

The illustrative, non-exclusive example of detector retaining structure 26 illustrated in FIG. 6 may be described as including a rib 60 having a generally trapezoidal profile and that extends at an angle from the inside surface of the housing generally adjacent an inside apex defined by the inside surface of the housing. Accordingly, as illustrated in FIG. 6, the body of the detector may be received generally within the defined apex. Stated differently, the rib of the detector retaining structure of FIG. 6 may be described as retaining, securing, and/or wedging the edge of the detector's body against at least one inside surface that defines an apex. A slight variation of the example illustrated in FIG. 6 may include the illustrated rib being spaced slightly further away from the illustrated apex 64, such that the rib would retain, secure, and/or wedge the edge of the detector's body against two adjacent inside surfaces that collectively define the apex, similar to the example of FIG. 4, but with a rib that perhaps provides additional retaining function than if the rib were not present.

Figure 7:
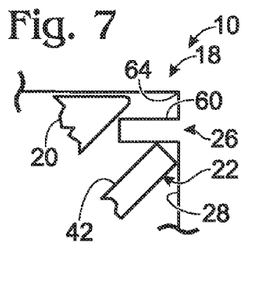
FIG. 7 is a somewhat less schematic diagram representing a portion of additional illustrative, non-exclusive examples of fuel senders according to the present disclosure.

FIG. 7 illustrates yet another illustrative, non-exclusive example of detector retaining structure 26 according to the present disclosure. The detector retaining structure of FIG. 7 may be described as including a rib 60 that extends from inside flat surface 28 of the housing, such as spaced away from an apex defined by the inside surface of the housing, if present. Accordingly, the rib may be described as retaining, securing, and/or wedging the edge of the detector's body against an inside surface of the housing.

Figure 8:
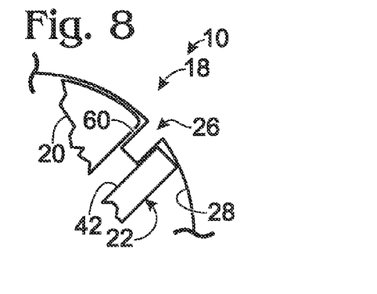
FIG. 8 is a somewhat less schematic diagram representing a portion of additional illustrative, non-exclusive examples of fuel senders according to the present disclosure.

Yet another illustrative, non-exclusive example of a configuration of a housing 18 and associated detector retaining structure 26 is illustrated in FIG. 8, with the illustrated inside surface being arcuate, or curved, such as (but not limited to) corresponding generally to a circular profile. A rib 60 extends from the inside surface and may be described as retaining, securing, and/or wedging the edge of the detector's body against the inside surface of the housing. In the example illustrated, the inside surface is arcuate on both sides of the rib; however, it is within the scope of the present disclosure that a housing may be configured with an inside surface that is flat adjacent one side of a rib and arcuate adjacent the other side of the rib.

Some detector retaining structure 26 according to the present disclosure, such as corresponding (but not limited) to the various configurations of FIGS. 5-8, may include exactly two ribs, subject to the permissible variations discussed herein with respect to what may be defined, or described, as a single rib, despite portions of a rib being removed, for example. Such configurations of detector retaining structures having exactly two ribs may be described herein as consisting of two ribs, thereby limiting the detector retaining structure to only two ribs, yet not excluding additional non-rib structure within the scope of the detector retaining structure. For example, an inside surface (or portion thereof) of the housing may be within the scope of the detector retaining structure even when the respective detector retaining structure is described as consisting of two ribs. Stated differently, when recited as "the detector retaining structure consists of two ribs extending longitudinally along the inside surface of the housing," the respective detector retaining structure includes exactly two ribs, with each rib optionally being broken up into a series of sections, as discussed herein.

Figure 9:
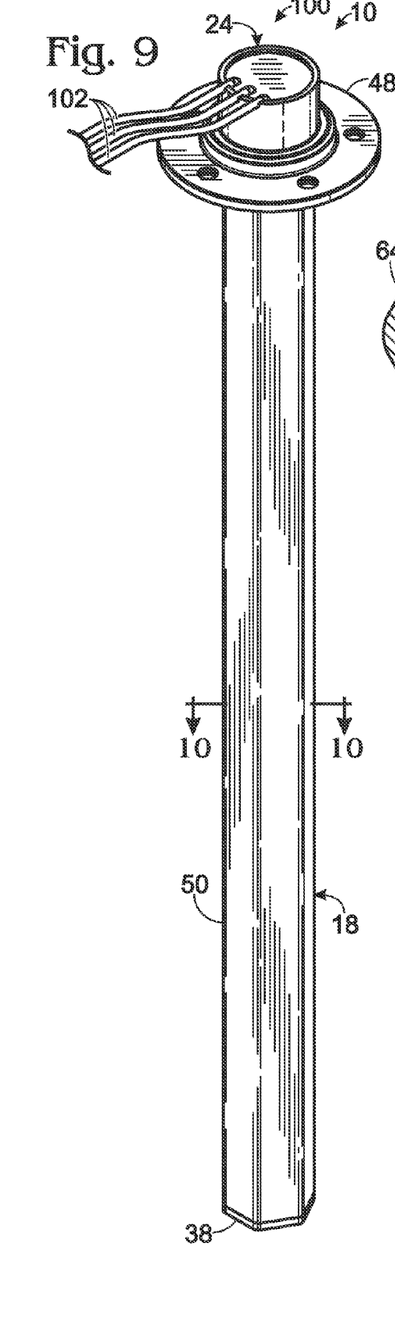
FIG. 9 is an isometric view of an illustrative, non-exclusive example of a fuel sender according to the present disclosure.
Figure 10:
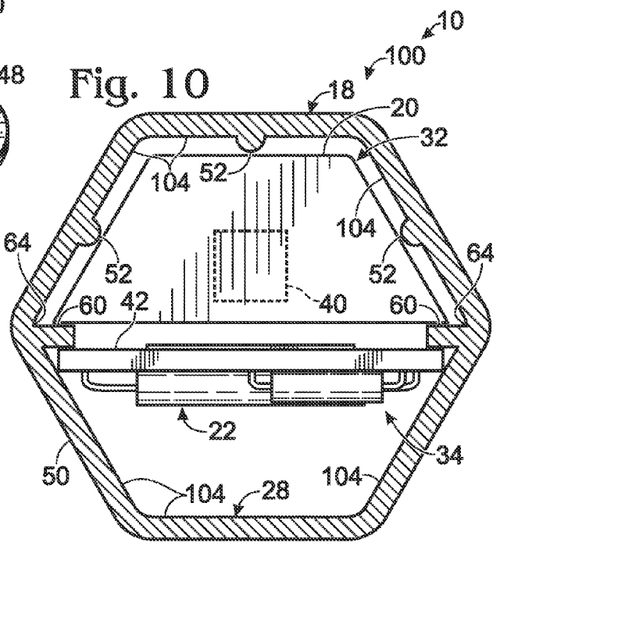
FIG. 10 is a cross-section of the fuel sender of FIG. 9, taken along line 10-10 in FIG. 9.

In FIGS. 9-10, an illustrative, non-exclusive example of a fuel sender 10 according to the present disclosure is illustrated and is indicated generally at 100. Where appropriate, the reference numerals from the schematic illustrations of FIGS. 1-8 are used to designate corresponding parts of fuel sender 100; however, the example of FIGS. 9-10 is non-exclusive and does not limit the present disclosure to the illustrated embodiment. That is, neither fuel senders 10 nor portions thereof are limited to the specific embodiment of fuel sender 100 illustrated in FIGS. 9-10, and fuel senders according to the present disclosure may incorporate any number of the various aspects, configurations, characteristics, properties, etc. of fuel sender 100, of the schematically illustrated examples of FIGS. 1-8, as well as variations thereof, without requiring the inclusion of all such aspects, configurations, characteristics, properties, etc. For the purpose of brevity, each previously discussed component, part, portion, aspect, region, etc. or variants thereof, may not be discussed again with respect to fuel sender 100; however, it is within the scope of the present disclosure that the previously discussed features, materials, variants, etc. may be utilized with fuel sender 100.

With reference to FIGS. 9-10, fuel sender 100 includes a housing 18, a float 20, a detector 22, a connector 24, an end cap 38, and a mounting member 48.

As seen in FIG. 9, the connector 24 of fuel sender 100 is an example of a connector that includes individual wires 102 for connection to an associated wiring harness. Such a configuration may be described as a pigtail connector. In an illustrative, non-exclusive example of a connector having three wires, or connections, such as fuel sender 100, two of the wires may correspond to plus and minus, or hot and ground, across which a voltage or resistance reading can be measured that corresponds to the configuration of an associated circuit, such as discussed herein with respect to FIG. 11. The third wire, or connection, when present, may allow for a signal to be transmitted, separate and apart from the measurement of a voltage or resistance of the detecting circuit. For example, this third wire may send a signal to a fuel gauge light, or other indicator, that signals to an operator of a vehicle that the level of fuel has dropped below a certain volume. Other embodiments are also within the scope of the present disclosure, including embodiments that include only two wires, or connections, such as only corresponding to plus and minus of the associated detecting circuit.

The housing of fuel sender 100 includes a hexagonally shaped ornamental outside surface 50 and is positioned between and connected to the end cap and the mounting member. As mentioned, however, any suitable outside surface configuration, including ornamental configurations, may be provided, regardless of an inside profile generally defined by the inner surface of the housing.

As seen in the cross-sectional view of FIG. 10, the housing of fuel sender 100 includes an inside surface 28 defined by a plurality of flat surfaces 104 that generally define a regular hexagonal profile. Directly adjacent to two opposing apexes 64 of the regular hexagonal profile, two ribs 60 extend from two of the flat surfaces. These ribs extend longitudinally and at least substantially along the entire length of the housing and have generally trapezoidal profiles. The housing of fuel sender 100 further includes three projections 52 extending from the three flat surfaces 104 that partially define float region 32.

The float 20 of fuel sender 100 has a trapezoidal profile and includes a magnet 40. As seen, the float engages the three projections 52 as well as the two ribs 60, thereby spacing the float away from the inside surface 28 of the housing, as well as away from body 42 of detector 22.

The body 42 of detector 22 of fuel sender 100 has an elongate rectangular profile and may be described as being retained, secured, and/or wedged between the two ribs 60 and adjacent flat surfaces 104 of the inside surface of the housing.

Figure 11:
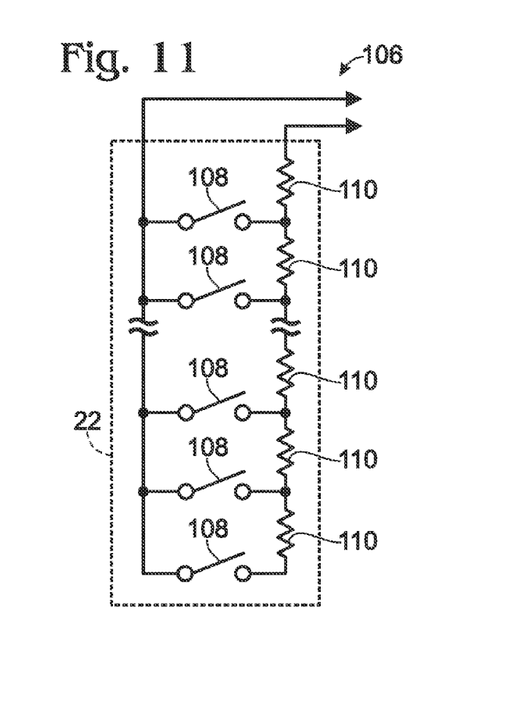
FIG. 11 is a wiring diagram representing an illustrative, non-exclusive circuit that may be used with fuel senders according to the present disclosure.

FIG. 11 schematically illustrates a wiring diagram of an illustrative, non-exclusive example of a circuit 106 that may be associated with the detector 22 of fuel sender 100, or with the detector of any fuel sender 10 according to the present disclosure. As seen, the illustrated circuit includes a plurality of switches 108 (e.g., reed switches), which in fuel sender 100 are spaced longitudinally along and are secured to the body of the detector. The circuit further includes a plurality of resistors 110 associated with the plurality of switches, and as illustrated schematically in FIG. 11, the circuit may include any suitable number of switches and resistors, such as corresponding to a desired resolution of the fuel sender and/or corresponding to the length of the housing of the fuel sender. As the magnet of the float comes into proximity with a switch, the switch will close and thereby complete the circuit with a specific resistance value being defined by the resistors that are in series within the completed portion of the circuit. As the float lowers within the housing, a lower switch will close, and the resistance value will increase. Conversely, as the float rises within the housing, a higher switch will close, and the resistance value will decrease. Other embodiments are within the scope of the present disclosure, including (but not limited to) circuits in which the resistance value will decrease as the float lowers within the housing and in which the resistance value will increase as the float rises within the housing.

Figure 12:
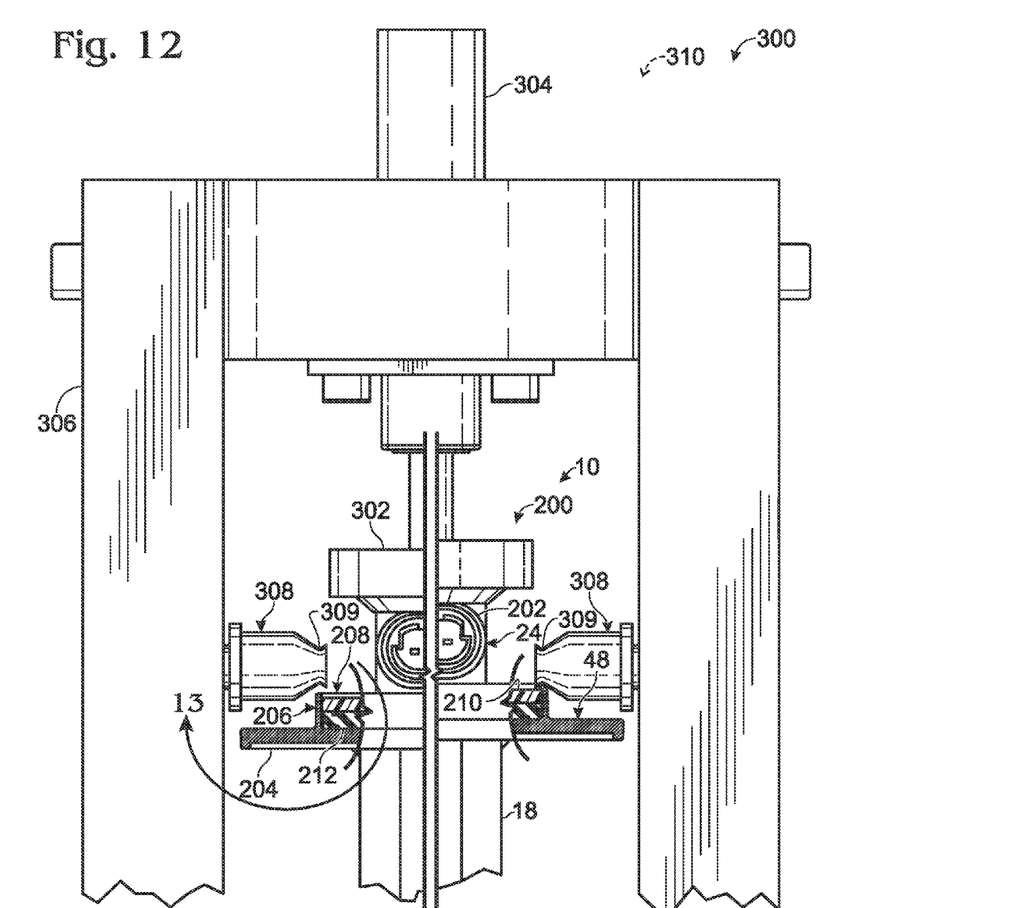
FIG. 12 is a side view of an illustrative, non-exclusive example of an assembly tool according to the present disclosure together with an associated illustrative, non-exclusive example of a fuel sender according to the present disclosure, with the fuel sender illustrated both prior to and during an operation of the assembly tool.
Figure 13:
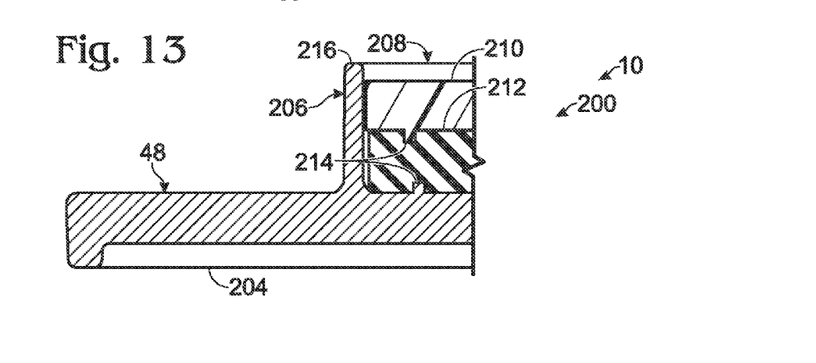
FIG. 13 is a detail view of a portion of the fuel sender of FIG. 12, generally corresponding to the region indicated by the line 13 in FIG. 12.

Turning now to FIGS. 12-13, a portion of another illustrative, non-exclusive example of a fuel sender 10 is illustrated, with the fuel sender indicated generally at 200. In FIG. 12, fuel sender 200 is illustrated together with an assembly tool 300 that is configured for coupling the connector 24 to the mounting member 48 of fuel sender 200. That said, the assembly tool 300 and the associated method of assembly discussed herein may be utilized with any fuel sender 10 according to the present disclosure, including fuel sender 100. Moreover, assembly tool 300 and similar tools and associated methods may be utilized with any suitable structure and are not limited to the assembly of fuel senders.

In FIG. 12, fuel sender 200 is illustrated in two parts, a left side and a right side as viewed in FIG. 12, with these two parts representing two different stages of the assembly method of the fuel sender, as discussed in more detail herein. More specifically, the left side of fuel sender 200 is illustrated in a pre-crimped configuration, while the right side of fuel sender 200 is illustrated in a crimped configuration, or in the process of being crimped.

Fuel sender 200 is an example of a fuel sender 10 that includes a connector 24 with a socket 202 that is configured to mate with a corresponding plug, such as of a wiring harness associated with a display device. Other than the inclusion of a socket 202, fuel sender 200 is structurally similar, and in some embodiments identical, to fuel sender 100. Accordingly, the following discussion with respect to the specific structure of fuel sender 200, including mounting member 48, may apply to fuel sender 100 and to any suitable fuel sender 10 according to the present disclosure.

The mounting member 48 of the illustrated fuel sender includes a flange 204 that extends transverse to a longitudinal axis of housing 18 and that is configured to secure the fuel sender to a vessel, such as a fuel tank. As seen in FIG. 9, the flange of fuel sender 100 includes a series of bolt holes that may be used to secure a fuel sender 10 to a fuel tank. Other configurations and mechanisms for securing fuel senders 10 to a corresponding vessel are also within the scope of the present disclosure and are not limited to flanges with bolt holes.

Still referring to FIGS. 12-13, the mounting member 48 of the illustrated fuel sender also includes a circular wall 206 that extends from flange 204. In the illustrated fuel sender, the circular wall extends from the flange on a side opposite the housing 18, and therefore may be described as extending away from the housing. This circular wall defines a space 208 in which at least a portion of connector 24 may be positioned during assembly. In the illustrated example, the connector may be described as including a circular base 210 that is shaped and sized to be received within and to seat within space 208.

A sealing member 212 is positioned within space 208 and is compressed between flange 204 and the circular base 210 of the connector. This sealing member may take any suitable form, including (but not limited to) a gasket or an o-ring. In the illustrative, non-exclusive example of fuel sender 200, flange 204 and circular base 210 each include a circular rib 214 extending from the respective surface that engages sealing member 212. These optional ribs 214, when present, may bite into the sealing member and thereby provide for a greater seal than if the ribs 214 were not present.

When fuel sender 200 is fully assembled, the upper edge 216 of the circular wall 206 is crimped, or bent, over the circular base 210 of the connector. This crimped configuration is illustrated in the right side of the fuel sender 200 in FIG. 12, and may serve to compress the sealing member and secure the connector 24 to the mounting member 48.

Assembly tools 300 according to the present disclosure are configured for coupling a connector 24 to a mounting member 48 of a fuel sender 10 according to the present disclosure. However, as mentioned, assembly tool 300 and the associated method also may be used to assemble any suitable structure and are not limited to being utilized for assembly of fuel senders, let alone to fuel senders 10 according to the present disclosure. Accordingly, in the following discussion, mounting member 48 is more broadly described as a first member 48, and connector 24 is more broadly described as a second member 24, such that the first and second members may be components of any suitable structure in which assembly thereof is at least partially facilitated with assembly tool 300.

Assembly tool 300 may therefore be described as a tool for coupling a first member 48 to a second member 24, and in some circumstances with a sealing member 212 between the first and second members. Assembly tool 300 includes a fixture 302 that is configured to engage second member 24 so that a portion of the second member may be positioned within the space 208 defined by the circular wall 206 of the first member 48. In the illustrated example, fixture 302 is positioned on a lower end of a shaft 304 and is configured to translate up and down with respect to a support member, or frame, 306 of assembly tool 300. In some embodiments, the fixture is biased relative to the frame to retain the circular base 210 of the second member 24 within space 208 and thus engaged with sealing member 212, when present. In some such embodiments, the weight of the shaft and/or fixture may serve to bias the fixture; however, other configurations are also within the scope of the present disclosure, including configurations that include a spring to bias the fixture.

Assembly tool 300 also includes at least one roller 308 (and in the illustrated example includes two rollers 308) that is supported by frame 306 and configured to rotate, or spin, relative to the frame. Roller 308 is configured to selectively engage the upper edge 216 of the circular wall 206 of first member 48 and to crimp, bend, or otherwise deform the upper edge over the circular base 210 of second member 24. In the illustrated embodiment, roller 308 defines a concave engagement surface 309 that engages the upper edge of the circular wall of the first member.

In some embodiments of assembly tool 300, frame 306 is configured to rotate around and relative to the first and second members, such that the entire circumference of the upper edge of the circular wall may be crimped over the circular base. It is also within the scope of the present disclosure, however, that the first member 48 is rotated relative to the roller, similarly such that the entire circumference of the upper edge of the circular wall may be crimped over the circular base. Accordingly, assembly tool 300 may be described as including a mechanism 310 that is configured to either revolve the roller around the first and second members or to rotate at least the first member relative to the roller. For example, mechanism 310 may include a motor.

Accordingly, a method of assembling a fuel sender 10 according to the present disclosure or a method of assembly of at least a first and second member as described herein, may include the steps of (i) positioning a sealing member between a first member and a second member, (ii) engaging the upper edge of the circular wall of the first member with at least one roller, and (iii) rotating the first member relative to the roller or revolving the roller around the first member so that the roller crimps the upper edge of the circular wall over a portion of the second member that is positioned within the space defined by the circular wall of the first member.

Illustrative, non-exclusive examples of inventions according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A A fuel sender configured to detect a level of fuel or other liquid held in a vessel, the fuel sender comprising:

a housing configured to extend at least partially into the vessel, wherein the housing includes:

an inside surface that defines an internal volume having a float region and a detector region adjacent to the float region; and detector retaining structure;

a float positioned within the float region, wherein the float is configured to rise and fall within the float region in response to the level of liquid held in the vessel;

a detector secured within the detector region by the detector retaining structure, wherein the detector is configured to detect a position of the float within the float region, and wherein the detector includes a body that is wedged against the inside surface of the housing by the detector retaining structure; and a connector electrically coupled to the detector and configured to be selectively coupled electrically to a display device for displaying the level of liquid held in the vessel.

A1 The fuel sender of paragraph A, wherein the housing is an extruded housing.

A2 The fuel sender of any of paragraphs A-A1, wherein the detector retaining structure consists of two ribs extending longitudinally along the inside surface of the housing.

A2.1 The fuel sender of paragraph A2, wherein the two ribs are generally opposite each other within the housing.

A2.2 The fuel sender of any of paragraphs A2-A2.1, wherein the two ribs extend longitudinally along an entire length of the housing.

A2.3 The fuel sender of any of paragraphs A2-A2.2, wherein the two ribs have a generally rectangular or trapezoidal profile.

A3 The fuel sender of any of paragraphs A-A2.3, wherein the inside surface includes at least one flat surface adjacent to the detector retaining structure and engaged with the body of the detector.

A3.1 The fuel sender of paragraph A3 when depending from any of paragraphs A2-A2.3, wherein the inside surface includes a flat surface adjacent to each of the two ribs, wherein the flat surfaces are on an opposite side of the two ribs from the float region.

A4 The fuel sender of any of paragraphs A-A3.1, wherein the inside surface includes a plurality of flat surfaces.

A4.1 The fuel sender of paragraph A4, wherein the plurality of flat surfaces generally define a polygonal profile of the internal volume of the housing.

A4.1.1 The fuel sender of paragraph A4.1, wherein the polygonal profile is a regular polygonal profile with the plurality of flat surfaces generally having equal widths.

A4.1.2 The fuel sender of any of paragraphs A4.1-A4.1.1, wherein the polygonal profile is a generally rectangular profile.

A4.1.3 The fuel sender of any of paragraphs A4.1-A4.1.1, wherein the polygonal profile is a generally pentagonal profile.

A4.1.4 The fuel sender of any of paragraphs A4.1-A4.1.1, wherein the polygonal profile is a generally hexagonal profile.

A4.1.5 The fuel sender of any of paragraphs A4.1-A4.1.4 when depending from any of paragraphs A2-A2.3, wherein at least one of the two ribs extends from an apex of the polygonal profile.

A4.1.6 The fuel sender of any of paragraphs A4.1-A4.1.4 when depending from any of paragraphs A2-A2.3, wherein both of the two ribs extend each from an apex of the polygonal profile.

A4.1.7 The fuel sender of any of paragraphs A4.1-A4.1.5 when depending from any of paragraphs A2-A2.3, wherein at least one of the two ribs extends from one of the plurality of flat surfaces that generally define the polygonal profile.

A4.1.7.1 The fuel sender of paragraph A4.1.7, wherein the at least one of the two ribs extends from one of the plurality of flat surfaces adjacent an apex of the polygonal profile.

A7.1.7.2 The fuel sender of paragraph A4.1.7, wherein the at least one of the two ribs extends from one of the plurality of flat surfaces directly adjacent an apex of the polygonal profile.

A4.1.8 The fuel sender of any of paragraphs A4.1-A4.1.4 when depending from any of paragraphs A2-A2.3, wherein both of the two ribs each extend from one of the plurality of flat surfaces that generally define the polygonal profile.

A4.1.8.1 The fuel sender of paragraph A4.1.8, wherein both of the two ribs each extend from one of the plurality of flat surfaces adjacent an apex of the polygonal profile.

A4.1.8.2 The fuel sender of paragraph A4.1.8, wherein both of the two ribs each extend from one of the plurality of flat surfaces directly adjacent an apex of the polygonal profile.

A4.2 The fuel sender of paragraph A4, wherein the plurality of flat surfaces includes at least two pair of flat surfaces, wherein each pair of flat surfaces generally defines an apex.

A4.2.1 The fuel sender of paragraph A4.2 when depending from any of paragraphs A2-A2.3, wherein at least one of the two ribs extend from one of the apexes.

A4.2.2 The fuel sender of paragraph A4.2 when depending from any of paragraphs A2-A2.3, wherein the two ribs each extend from one of the apexes.

A4.2.3 The fuel sender of any of paragraphs A4.2-A4.2.1 when depending from any of paragraphs A2-A2.3, wherein at least one of the two ribs extend from one of the plurality of flat surfaces.

A4.2.4 The fuel sender of paragraph A4.2 when depending from any of paragraphs A2-A2.3, wherein the two ribs each extend from one of the plurality of flat surfaces.

A4.2.4.1 The fuel sender of paragraph A4.2.2, wherein the two ribs each extend from one of the plurality of flat surfaces adjacent to one of the apexes.

A4.2.4.2 The fuel sender of paragraph A4.2.2, wherein the two ribs each extend from one of the plurality of flat surfaces directly adjacent to one of the apexes.

A5 The fuel sender of any of paragraphs A-A4.2.4.2, wherein the housing includes an outside surface that is ornamental in nature.

A5.1 The fuel sender of paragraph A5, wherein the outside surface includes a plurality of flat outside surfaces.

A5.1.1 The fuel sender of paragraph A5.1, wherein the plurality of flat outside surfaces generally define a polygonal outside profile.

A5.1.1.1 The fuel sender of paragraph A5.1.1, wherein the polygonal outside profile is a generally regular polygonal outside profile with the plurality of flat outside surfaces having generally equal widths.

A5.1.1.2 The fuel sender of any of paragraphs A5.1.1-A5.1.1.1, wherein the polygonal outside profile is a generally rectangular outside profile.

A5.1.1.3 The fuel sender of any of paragraphs A5.1.1-A5.1.1.1, wherein the polygonal outside profile is a generally pentagonal outside profile.

A5.1.1.4 The fuel sender of any of paragraphs A5.1.1-A5.1.1.1, wherein the polygonal outside profile is a generally hexagonal outside profile.

A6 The fuel sender of any of paragraphs A-A5.1.1.4, wherein the detector includes a plurality of switches positioned along a longitudinal length of the detector, wherein the plurality of switches are configured to open and close in response to the float rising and falling within the float region in response to the level of liquid held in the vessel.

A6.1 The fuel sender of paragraph A6, wherein the detector further includes a plurality of resistors associated with the plurality of switches.

A6.2 The fuel sender of any of paragraphs A6-A6.1, wherein the float includes at least one magnet and the plurality of switches are configured to open and close in response to the at least one magnet's position relative to the plurality of switches.

A7 The fuel sender of any of paragraphs A-A6.2, further comprising:

a mounting member coupled to the housing and the connector, wherein the mounting member includes:

a flange extending generally transverse to a longitudinal axis of the housing, wherein the flange is configured to secure the fuel sender to the vessel; and a circular wall extending from the flange and away from the housing, the circular wall defining a space in which at least a portion of the connector is positioned; and a sealing member positioned within the space and compressed between the mounting member and the connector;

wherein an upper edge of the circular wall is crimped over the portion of the connector positioned within the space to compress the sealing member and secure the connector to the mounting member.

A7.1 A method of assembling the fuel sender of paragraph A7, the method comprising:

positioning the sealing member within the space between the connector and the mounting member;

engaging the upper edge of the circular wall with at least one roller; and rotating the mounting member relative to the at least one roller so that the at least one roller crimps the upper edge of the circular wall over the portion of the connector positioned in the space.

A7.1.1 The method of paragraph A7.1, wherein the at least one roller defines a concave engagement surface that engages the upper edge of the circular wall during the engaging.

A7.1.2 The method of any of paragraphs A7.1-A7.1.1, wherein the at least one roller includes two rollers.

B A method of assembly, comprising:

positioning a sealing member between a first member and a second member, wherein the first member includes a circular wall that defines a space for receiving the sealing member and at least a portion of the second member, wherein the circular wall includes an upper edge;

engaging the upper edge of the circular wall with at least one roller; and rotating the first member relative to the at least one roller or revolving the at least one roller around the first member so that the at least one roller crimps the upper edge of the circular wall over the portion of the second member positioned within the space.

B1 The method of paragraph B, wherein the at least one roller defines a concave engagement surface that engages the upper edge of the circular wall during the engaging.

B2 The method of any of paragraphs B-B1, wherein the at least one roller includes two rollers.

B3 The method of any of paragraphs B-B2, used to assemble the fuel sender of any of paragraphs A-A7.

C An assembly tool for coupling a first member to a second member and optionally with a sealing member between the first and second members, wherein a first member includes a circular wall that defines a space for receiving at least a portion of the second member and optionally the sealing member between the first and second members, and wherein the circular wall includes an upper edge, the assembly tool comprising:

a fixture configured to retain the at least a portion of the second member within the space defined by the circular wall of the first member;

at least one roller configured to selectively engage the upper edge of the first member; and a mechanism configured to:

revolve the at least one roller around the upper edge of the circular wall; or rotate the first member relative to the at least one roller.

C1 The assembly tool of paragraph C, wherein the at least one roller includes two rollers.

C2 The assembly tool of any of paragraphs C-C1, further comprising:

a support member, wherein the at least one roller is supported by the support member;

wherein the fixture is configured to selectively translate relative to the support member.

C2.1 The assembly tool of paragraph C2, wherein the fixture is biased relative to the support member to retain the at least a portion of the second member within the space defined by the circular wall of the first member.

C3 The assembly tool of any of paragraphs C-C2.1, wherein the assembly tool is configured to assemble the fuel sender of any of paragraphs A-A7.

In the event that any of the references that are incorporated by reference herein define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" when used to describe an element, component, or other subject matter, mean that the element, component, or other subject matter is designed and/or intended to perform the recited function. Thus, the use of the terms "adapted" and "configured" should not be construed to mean that a given element, component, or other subject matter simply is "capable of" performing the recited function. Rather, the element, component, and/or other subject matter is created specifically for the purpose of performing the recited function. It is also within the scope of the present disclosure that elements, components, and/or other subject matter that is recited as being configured to perform a particular function may additionally or alternatively be described as being adapted to perform that function, and vice versa.

The disclosure set forth above encompasses multiple distinct inventions with independent utility. While each of these inventions has been disclosed in its preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods, and/or steps disclosed herein. Similarly, where any disclosure above or claim below recites "a" or "a first" element, step of a method, or the equivalent thereof, such disclosure or claim should be understood to include incorporation of one or more such elements or steps, neither requiring nor excluding two or more such elements or steps.

It is believed that the following claims particularly point out certain combinations and subcombinations that are directed to one of the disclosed inventions and are novel and non-obvious. Inventions embodied in other combinations and subcombinations of features, functions, elements, properties, methods, and/or steps may be claimed through amendment of the present claims or presentation of new claims in this or a related application. Such amended or new claims, whether they are directed to a different invention or directed to the same invention, whether different, broader, narrower, or equal in scope to the original claims, also are regarded as within the subject matter of the inventions of the present disclosure.

The invention claimed is:

1. A fuel sender configured to detect a level of fuel or other liquid held in a vessel, the fuel sender comprising:
   a housing configured to extend at least partially into the vessel, wherein the housing includes:
      an inside surface that defines an internal volume having a float region and a detector region adjacent to the float region, wherein the inside surface includes at least two flat surfaces; and
      detector retaining structure, wherein the detector retaining structure consists of two ribs each extending at an acute angle from a respective one of the at least two flat surfaces and longitudinally along the inside surface of the housing;
   a float positioned within the float region, wherein the float is configured to rise and fall within the float region in response to the level of liquid held in the vessel;
   a detector secured within the detector region by the detector retaining structure, wherein the detector is configured to detect a position of the float within the float region, and wherein the detector includes a body with opposing edges each wedged between a single one of the ribs and the adjacent respective flat surface;
   a connector electrically coupled to the detector and configured to be selectively coupled electrically to a display device for displaying the level of liquid held in the vessel;
   a mounting member coupled to the housing and the connector, wherein the mounting member includes:
      a flange extending generally transverse to a longitudinal axis of the housing, wherein the flange is configured to secure the fuel sender to the vessel; and
      a circular wall extending from the flange and away from the housing, the circular wall defining a space in which at least a portion of the connector is positioned; and
   a sealing member positioned within the space and compressed between the mounting member and the connector;
   wherein an upper edge of the circular wall is crimped over the portion of the connector positioned within the space to compress the sealing member and secure the connector to the mounting member.

2. A fuel sender configured to detect a level of fuel or other liquid held in a vessel, the fuel sender comprising:
   a housing configured to extend at least partially into the vessel, wherein the housing includes:
      an inside surface that defines an internal volume having a float region and a detector region adjacent to the float region, wherein the housing does not include a wall between the detector region and the float region; and
      detector retaining structure;
   a float positioned within the float region, wherein the float is configured to rise and fall within the float region in response to the level of liquid held in the vessel;
   a detector secured within the detector region by the detector retaining structure, wherein the detector is configured to detect a position of the float within the float region, and wherein the detector includes a body that is wedged against the inside surface of the housing by the detector retaining structure; and
   a connector electrically coupled to the detector and configured to be selectively coupled electrically to a display device for displaying the level of liquid held in the vessel.

3. The fuel sender of claim 2, wherein the detector retaining structure consists of two ribs extending longitudinally along the inside surface of the housing.

4. The fuel sender of claim 3, wherein the two ribs are generally opposite each other within the housing.

5. The fuel sender of claim 2, wherein the inside surface includes at least one flat surface adjacent to the detector retaining structure and engaged with the body of the detector.

6. The fuel sender of claim 2, wherein the detector retaining structure consists of two ribs extending longitudinally along the inside surface of the housing, and wherein the inside surface includes a flat surface adjacent to each of the two ribs, wherein the flat surfaces are on an opposite side of the two ribs from the float region.

7. The fuel sender of claim 2, wherein the inside surface includes a plurality of flat surfaces, and wherein the plurality of flat surfaces generally define a polygonal profile of the internal volume of the housing.

8. The fuel sender of claim 7, wherein the polygonal profile is a regular polygonal profile with the plurality of flat surfaces generally having equal widths.

9. The fuel sender of claim 7, wherein the polygonal profile is a generally hexagonal profile.

10. The fuel sender of claim 7, wherein the detector retaining structure consists of two ribs extending longitudinally along the inside surface of the housing, wherein at least one of the two ribs extends from an apex of the polygonal profile.

11. The fuel sender of claim 7, wherein both of the two ribs each extend from one of the plurality of flat surfaces adjacent an apex of the polygonal profile.

12. The fuel sender of claim 7, wherein both of the two ribs each extend from one of the plurality of flat surfaces directly adjacent an apex of the polygonal profile.

13. The fuel sender of claim 2, wherein the inside surface includes at least one curved surface, wherein the detector retaining structure consists of two ribs extending from the at least one curved surface longitudinally along the inside surface of the housing, and wherein the body of the detector is wedged against the at least one curved surface by the two ribs.

14. The fuel sender of claim 2, wherein the detector includes a plurality of switches positioned along a longitudinal length of the detector, wherein the plurality of switches are configured to open and close in response to the float rising and falling within the float region in response to the level of liquid held in the vessel.

15. The fuel sender of claim 14, wherein the float includes at least one magnet and the plurality of switches are configured to open and close in response to the at least one magnet's position relative to the plurality of switches.

16. The fuel sender of claim 2, further comprising:
a mounting member coupled to the housing and the connector, wherein the mounting member includes:
a flange extending generally transverse to a longitudinal axis of the housing, wherein the flange is configured to secure the fuel sender to the vessel; and
a circular wall extending from the flange and away from the housing, the circular wall defining a space in which at least a portion of the connector is positioned; and
a sealing member positioned within the space and compressed between the mounting member and the connector;
wherein an upper edge of the circular wall is crimped over the portion of the connector positioned within the space to compress the sealing member and secure the connector to the mounting member.

17. A method of assembling the fuel sender of claim 16, the method comprising:
positioning the sealing member within the space between the connector and the mounting member;
engaging the upper edge of the circular wall with at least one roller; and
rotating the mounting member relative to the at least one roller so that the at least one roller crimps the upper edge of the circular wall over the portion of the connector positioned in the space.

18. The method of claim 17, wherein the at least one roller defines a concave engagement surface that engages the upper edge of the circular wall during the engaging.

* * * * *